United States Patent [19]

Cheng

[11] Patent Number: 5,657,101
[45] Date of Patent: Aug. 12, 1997

[54] LCD HAVING A THIN FILM CAPACITOR WITH TWO LOWER CAPACITOR ELECTRODES AND A PIXEL ELECTRODE SERVING AS AN UPPER ELECTRODE

[75] Inventor: Jia-Shyong Cheng, Hsin-Chu, Taiwan

[73] Assignee: Industrial Technology Research Institute, Hsinchu, Taiwan

[21] Appl. No.: 573,309

[22] Filed: Dec. 15, 1995

[51] Int. Cl.⁶ .................. G02F 1/136; G02F 1/1343; H01L 29/04
[52] U.S. Cl. .................. 349/42; 257/59; 349/38
[58] Field of Search .................. 359/59, 87; 257/59

[56] References Cited

U.S. PATENT DOCUMENTS

| | | | |
|---|---|---|---|
| 5,028,122 | 7/1991 | Hamada et al. | 259/59 |
| 5,062,690 | 11/1991 | Whetten | 359/59 |
| 5,173,791 | 12/1992 | Strathman et al. | 359/57 |
| 5,182,620 | 1/1993 | Shimada et al. | 359/59 |
| 5,182,661 | 1/1993 | Ikeda et al. | 359/59 |
| 5,339,181 | 8/1994 | Kim et al. | 359/59 |
| 5,343,316 | 8/1994 | Morimoto et al. | 359/50 |
| 5,384,517 | 1/1995 | Uno | 315/169.3 |
| 5,424,857 | 6/1995 | Aoki et al. | 359/59 |
| 5,517,341 | 5/1996 | Kim et al. | 359/59 |
| 5,517,342 | 5/1996 | Kim et al. | 359/59 |
| 5,528,395 | 6/1996 | So | 359/59 |
| 5,546,205 | 8/1996 | Sukegawa et al. | 359/59 |
| 5,574,582 | 11/1996 | Takeda et al. | 359/59 |

FOREIGN PATENT DOCUMENTS 1-154033  6/1989  Japan.

OTHER PUBLICATIONS

"A High–Aperture–Ratio Pixel Structure for High–Density a Si TFT Liquid Crystal Light Vaires" by N. Takahashi et al, SID '93 digest, pp. 610–613.

*Primary Examiner*—Anita Pellman Gross
*Assistant Examiner*—Toan Ton
*Attorney, Agent, or Firm*—George O. Saile

[57] ABSTRACT

A thin film liquid crystal display, having a high aperture ratio, is described. Said display has been designed so as to reduce the incidence of short circuits between its various parts.

This has been achieved by modifying the structure of the lower electrode of the storage capacitor. Said lower electrode is formed in the shape of a hollow square, two non-adjacent sides of said hollow square being at the level of the gate electrode, the other two sides of the hollow square being at the level of the data line. Two different means for providing electrical contact between all four sides of said lower capacitor electrode are described.

A process for manufacturing the display is described.

12 Claims, 9 Drawing Sheets

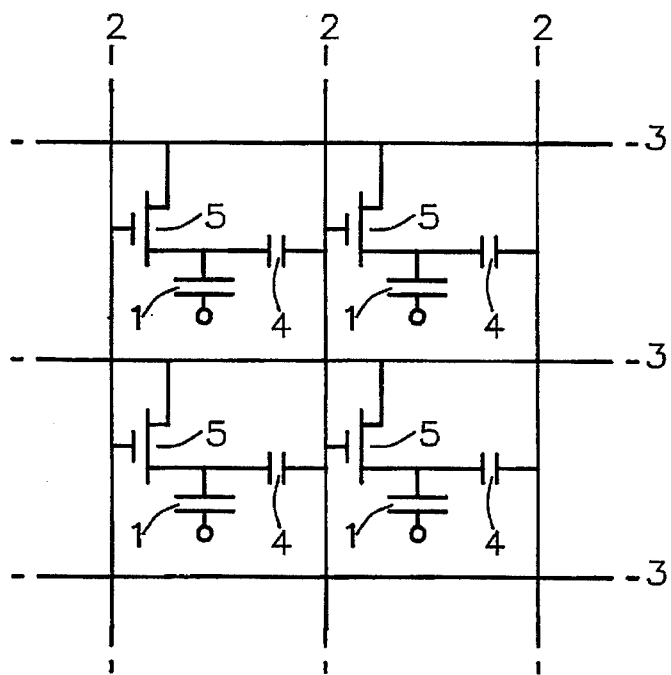
FIG. 1 - Prior Art
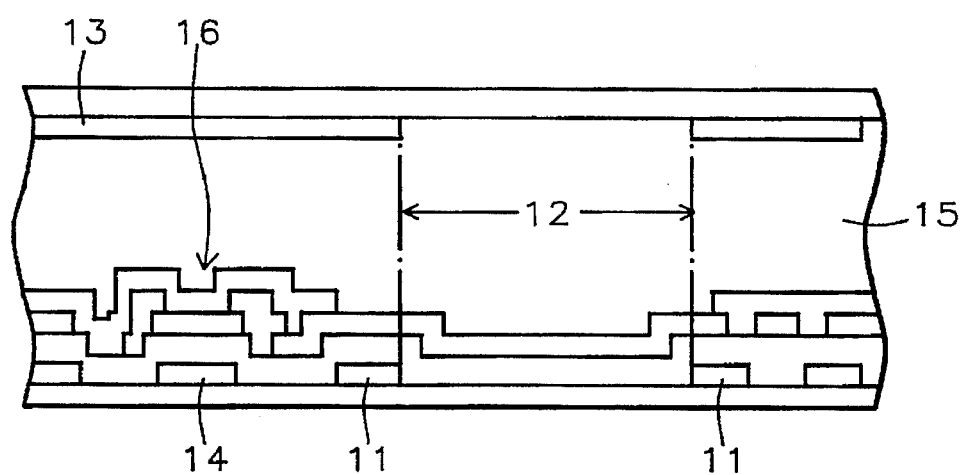
FIG. 2a - Prior Art

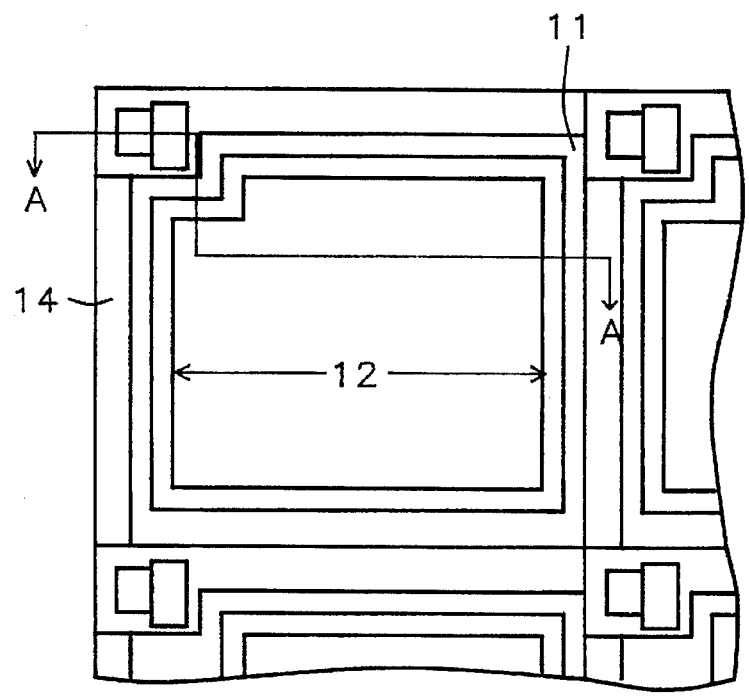
FIG. 2b – Prior Art
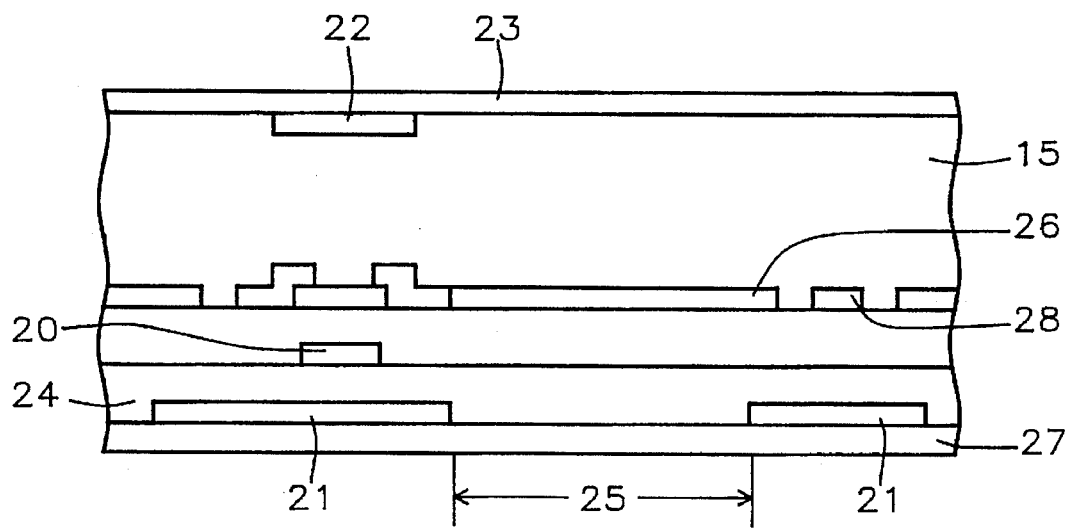
FIG. 3a – Prior Art

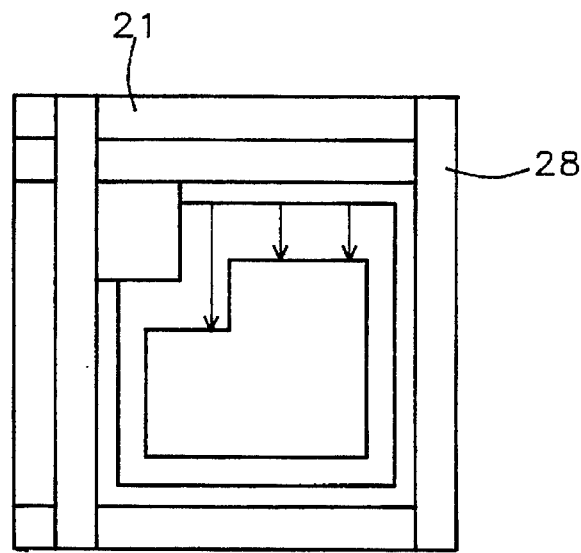
*FIG. 3b - Prior Art*
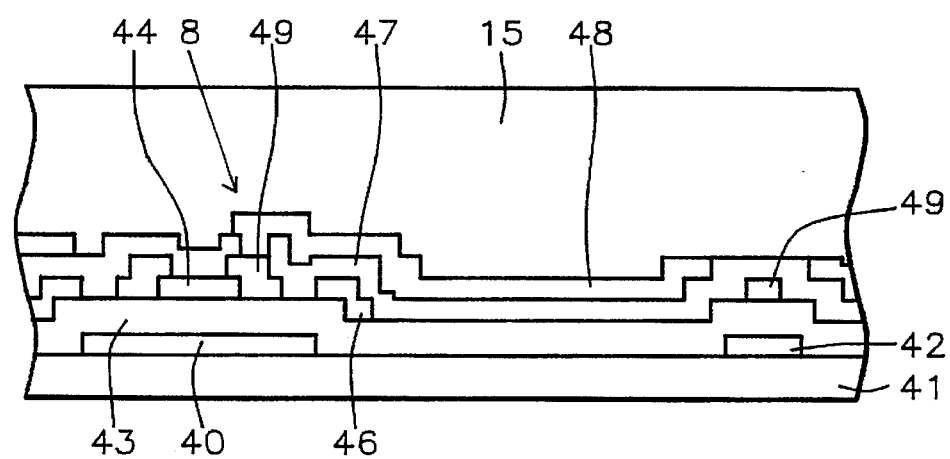
*FIG. 4a*

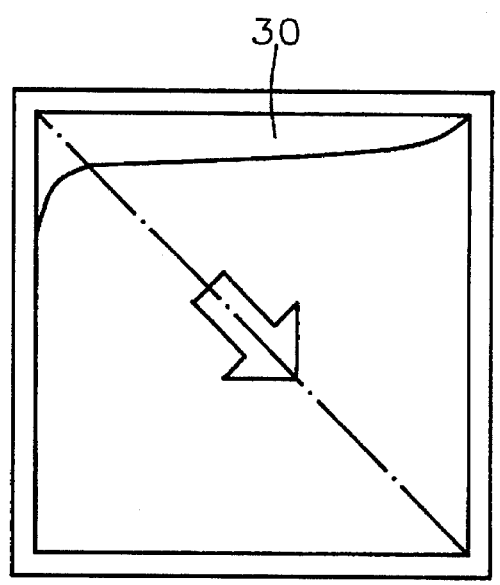
FIG. 3c - Prior Art

LCD HAVING A THIN FILM CAPACITOR WITH TWO LOWER CAPACITOR ELECTRODES AND A PIXEL ELECTRODE SERVING AS AN UPPER ELECTRODE

BACKGROUND OF THE INVENTION (1) Field of the Invention

The invention relates to the general field of liquid crystal displays, more particularly to the problem of providing a high aperture ratio without an increase in the complexity of the associated manufacturing process.

(2) Description of the Prior Art

FIG. 1 shows a schematic diagram of the circuit used to control a plurality of individual pixels, each comprising a Liquid Crystal (LC) device, arranged as an X-Y addressable array.

A layer of LC 1 is located between two electrodes, at least one of which is transparent. One of said electrodes is grounded and the other electrode is connected to one of the scan lines 2 and to one of the data lines 3, thus making it uniquely addressable—it will not be activated unless voltage is applied to both the appropriate scan and data lines simultaneously. Power to drive the LC is supplied by the data line but its availability is controlled from the scan line through Field Effect Transistor (FET) 5.

Additionally, a capacitor 4 is included with each pixel for the purpose of extending the time that the pixel is active beyond the very short time during which it receives voltage from both the scan and data lines simultaneously. This is analogous to using a long persistent phosphor in a cathode ray tube.

The physical implementation of the circuit diagrammed in FIG. 1 forms the subject matter of the present invention. Problems that must be overcome in order to achieve a good implementation include improving the aperture ratio of the device, eliminating or reducing places where shorting may occur between different parts of the structure, and providing a cost effective process for its manufacture.

A conventional implementation, typical of the prior art, is shown in FIGS. 2(a) and (b), the former being a cross-section of the latter through AA. LC 15 is sandwiched between two glass substrates. In addition to Thin Film Transistor (TFT) 16, storage capacitor 11 has been located at the same level as scan (or gate) line 14 to increase the opening of aperture 12. Capacitor layer 11 and black matrix layer 13 combine to block out extraneous light. This structure has to allow for extra space to avoid the possibility of side-to-side shorting between capacitor 11 and scan line 14, since they are at the same level. This goes counter to the requirement that space be limited in order to increase pixel density (i.e. keep the pixel pitch small) so only a limited aperture ratio can be achieved with this structure.

FIG. 3(a) shows, in schematic cross-section, an example of an improved approach to the problem that has been described in the prior art by Takahashi et al. ('A high-aperture-ratio pixel structure for high-density a-Si TFT liquid crystal light valves' by N. Takahashi et al. the SID 93 digest pp. 610–613). In this structure, LC 15 is contained between upper and lower glass plates 23 and 27 respectively. The gate electrode 20 and the storage capacitor 21 are located at different levels. Light shields 21 are separated from FET control gate 20 by insulating layer 24, the space beween the light shields defining device aperture 25. This determines the amount of light that is allowed to pass through transparent electrode 26. This design requires the presence of a second light shield 22 that is located on upper glass plate 23. FIG. 3(b) is a plan view of the structure of FIG. 3(a).

This structure allows more latitude in determining the size of aperture 25 (in FIG. 3(a)) but it requires additional process steps relative to other known structures and, in particular, it requires the presence of the secondary light shield 22 in order to avoid illumination of the TFT. Continuing our reference to FIG. 3(a), scan line 20 and transparent pixel electrode 26 are located on the same side as common electrode 21, so the common electrode of storage capacitor 21 cannot be fully utilized to block the electric field of the scan line. This causes some light leakage 30 (in FIG. 3(c)) in one corner of the aperture, requiring light shield 21 to have larger area.

Other prior art that relates to this area includes U.S. Pat. No. 5,028,122 (July 1991) by Hamada et al. which describes overlapping the gate electrodes with the pixel electrodes so as to provide additional capacitance. This is not the problem solved by the present invention.

SUMMARY OF THE INVENTION

It has been an object of the present invention to provide a thin film transistor liquid crystal display having an improved aperture ratio between the transparent and opaque areas of the pixels.

A further object of the present invention has been to provide a structure that meets the first objective while at the same time reducing the incidence of short circuits between the various parts that comprise said structure.

Another object of the present invention has been to provide a process for manufacturing a thin film transistor liquid crystal display that conforms to the first two objectives, said process to be no more costly than similar processes already in use in the prior art.

These objects have been achieved by modifying the structure of the lower electrode of the storage capacitor. Said lower electrode is formed in the shape of a hollow square, two non-adjacent sides of said hollow square being at the level of the gate electrode, the other two sides of the hollow square being at the level of the data line. Two different means for providing electrical contact between all four sides of said lower capacitor electrode are described. In the first, four via holes are formed at the four corners of the hollow square and material from the two layers that are at different levels make electrical contact through them. In the second, only two via holes, located at two adjacent corners of the hollow square, are used, additional contact being provided by the overlap of the pixel electrode and the scan line.

BRIEF DESCRIPTION OF THE DRAWINGS

FIG. 1 is a schematic diagram of the circuit used to provide an X-Y addressable array of liquid crystal devices.

FIGS. 2(a) and (b) show, in cross-section and plan respectively, a typical liquid crystal pixel structure that can be found in the prior art.

FIGS. 3(a) and (b) show a relatively recent improvement over the prior art of FIG. 2.

FIG. 3(c) shows the light leakage region in the absence of a black matrix.

FIGS. 4(a) through (e) show plan views of two embodiments of the present invention together with three appropriate cross-sections. These embodiments eliminate the need for a black matrix.

DESCRIPTION OF THE PREFERRED EMBODIMENTS

Referring now to FIG. 4(a), we show there a cross-section illustrating the inverted staggered TFT configuration, which is a feature of the present invention. First, a metal layer comprising a material such as chromium, tantalum or aluminum, and having a thickness between about 500 and 4,000 Angstrom units, typically about 1,000 Angstroms, is deposited through sputtering (or similar deposition technique) onto glass substrate 41. Through lithography and etching, gate electrode 40 and first electrode 42 of the storage capacitor, located in the vicinity of the data lines, are formed.

Figure 4B:
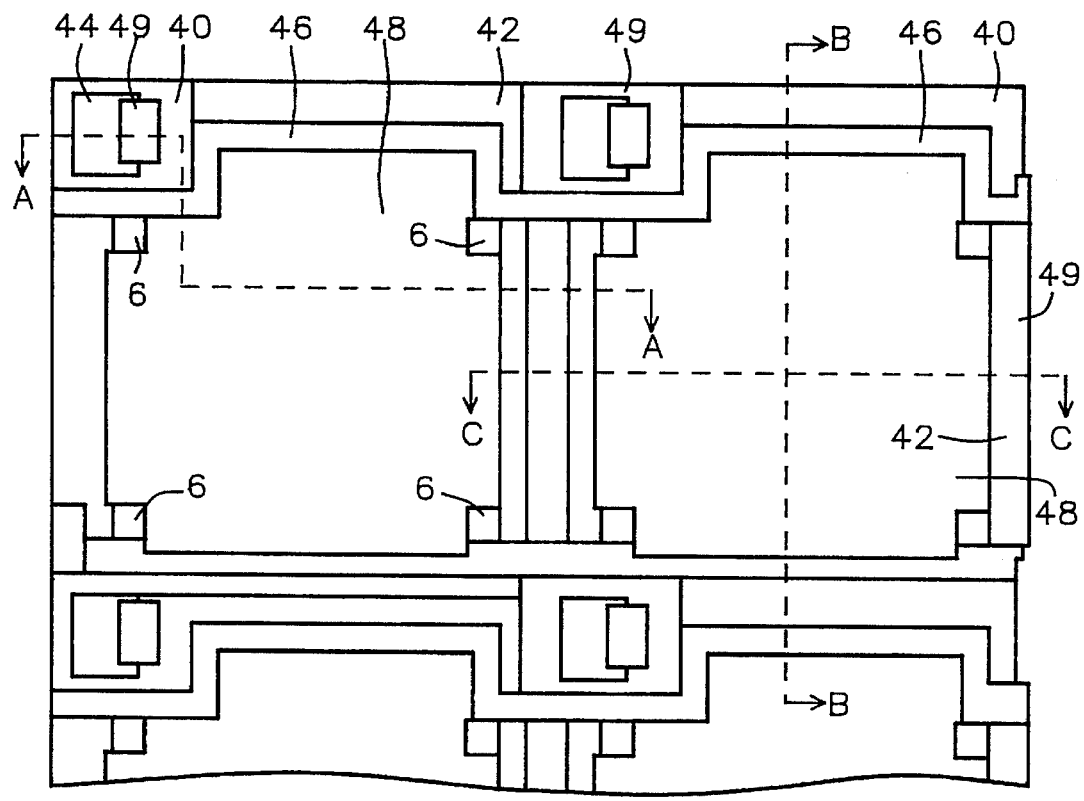

Gate insulator layer 43, comprising silicon nitride, silicon oxide, aluminum oxide, or an anodic oxide and having a thickness between about 1,000 and 5,000 Angstrom units, typically about 3,000 Angstroms, is formed on the upper surface of the glass substrate including the upper surfaces of gate electrode 40 and storage electrode 42. A semiconducting layer 44, comprising amorphous silicon and having a thickness between about 300 and 3,000 Angstrom units, typically about 1,000 Angstroms, is formed on gate insulator layer 43. In order to electrically connect the drain and source electrodes to semiconducting layer 44 a contacting layer (not shown), comprising heavily doped amorphous silicon and having a thickness between about 300 and 1,000 Angstrom units, typically about 500 Angstroms, is formed on semiconducting layer 44. After lithography and etching contact holes 6 (as shown in FIG. 4(b)) are formed for interconnection purposes.

Next, a layer comprising a metal such as chromium, having a thickness between about 1,000 and 6,000 Angstrom units, typically about 2,000 Angstroms, is sputtered and patterned to form data line 49, source and drain, and separated first electrode 46 of the storage capacitor, located around the region of the scan lines. This storage electrode 46 connects with another storage electrode 42 through the contact holes 6 to form a ring shape. In addition, a transparent insulating layer 47, comprising a material such as silicon nitride, silicon oxide, aluminum oxide, an anodic oxide, or a polyimide, is deposited on substantially the entire exposed surface.

The drain electrode 49 is then covered with capacitor dielectric layer 47 to insulate it from other electrodes. The thickness of insulating layer 47 is between about 2,000 and 5,000 Angstrom units, typically about 3,000 Angstroms. A through-hole extending through insulating layer 47 is formed in a portion of layer 47 above the source electrode 49. Finally, a transparent conducting electrode 48, comprising Indium Tin Oxide (ITO), and having a thickness between about 500 and 3,000 Angstrom units, typically about 1,000 Angstroms, is formed on the upper surface of insulating layer 47. Transparent electrode 48 extends into the through-hole 8 and hence is electrically connected to source electrode 49.

It is also possible for pixel electrode 48 to comprise an opaque conductor. In such a case the embodiment would be for a reflective type TFT Liquid Crystal Display.

Figure 4C:
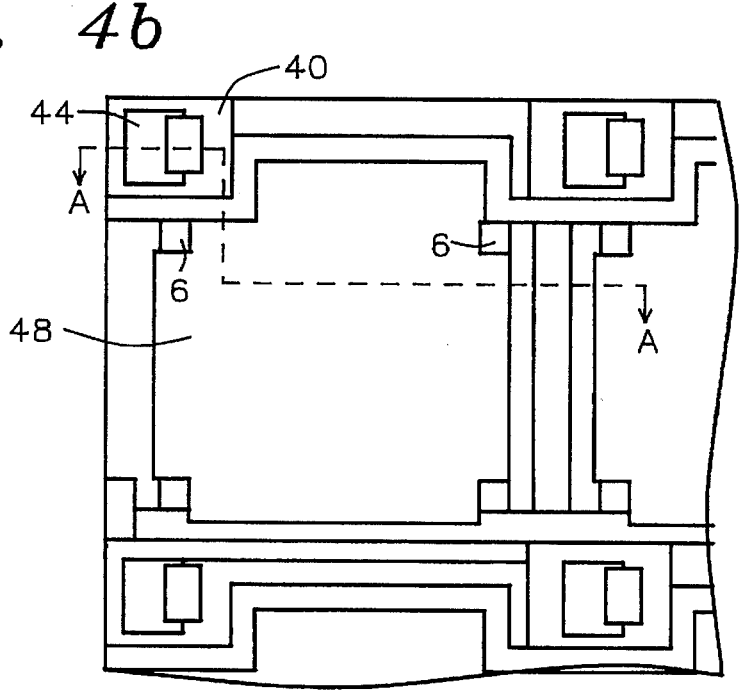
Figure 4D:
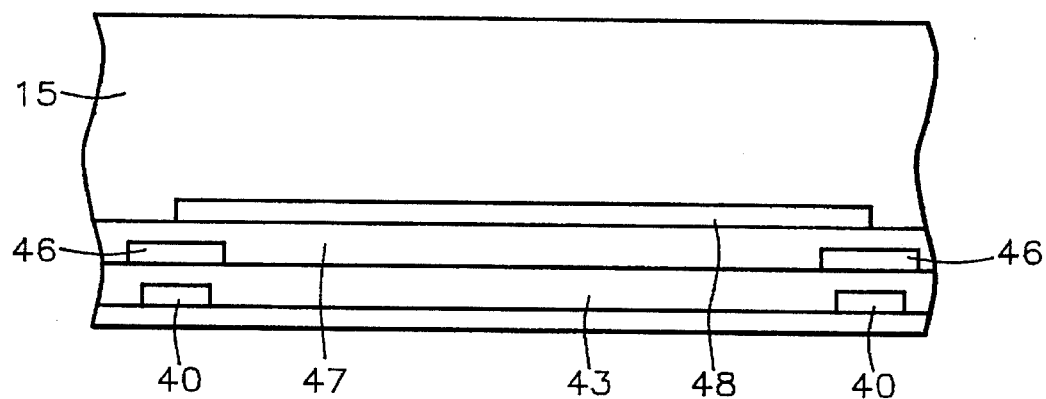
Figure 4E:
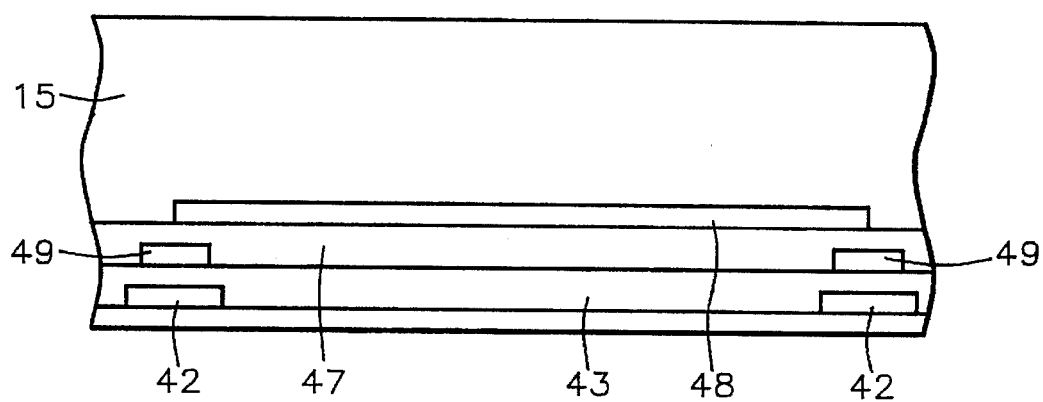

FIGS. 4(a) through 4(e) illustrate various embodiments of the above described structure. FIG. 4(a) is cross-section AA in both of plan views 4(b) and 4(c) which show slightly different layouts for the storage capacitor. In FIG. 4(c) the storage capacitor ring is completed by the overlap between the pixel electrode and the next scan line, so only two contact holes are needed per cell. FIG. 4(d) is a section of the plan view shown in FIG. 4(b) taken along vertical line BB in FIG. 4(b). FIG. 4(e) is a section taken along a horizontal line CC in FIG. 4(b).

The present invention efficiently utilizes a single conducting layer to form the gate electrode (which is also the scan line) and the drain/source layer (or data line) into a ring shaped storage capacitor through interconnection of the contact holes. This storage electrode overlaps scan line and data line. The combination of storage electrode, scan line, and data line serves the function of an integrated black matrix to avoid light leaks. This process is easier than the process illustrated in FIG. 3, for example. In the process that produces the structure of FIG. 3, storage electrode 21 and insulator 24 represent additional steps in the process.

In the present invention, storage electrode 46 is set over scan line 40 to shield the lateral field from the scan line voltage. So the effect of the lateral field of scan line 40 on the arrangement of the LC in the pixel electrode can be effectively avoided. Even if pixel electrode 48 overlaps scan line 40, no parasitic capacitance is added. So the aperture ratio is efficiently increased and the problem of the lateral field is greatly reduced.

Figure 5A:
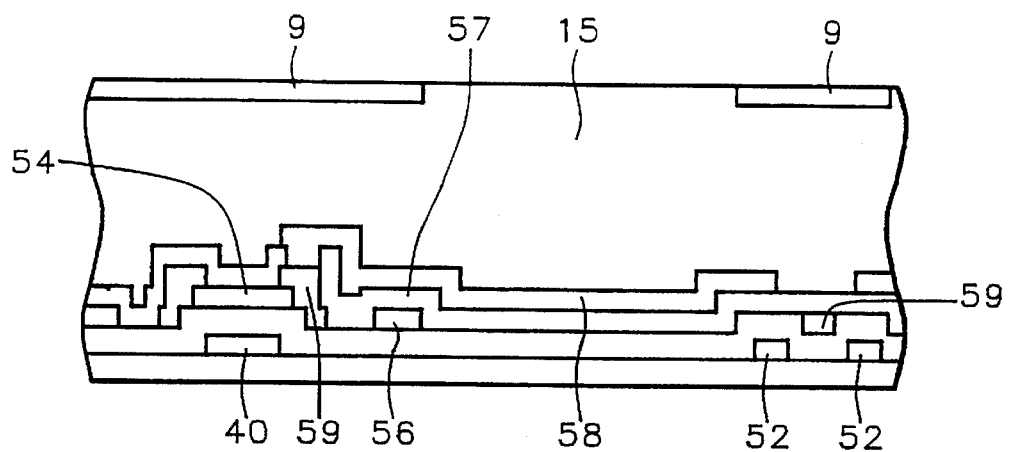
FIGS. 5(a) through (d) show a plan view of a third embodiment of the present invention together with three appropriate cross-sections. This embodiment requires the presence of a black matrix.
Figure 5B:
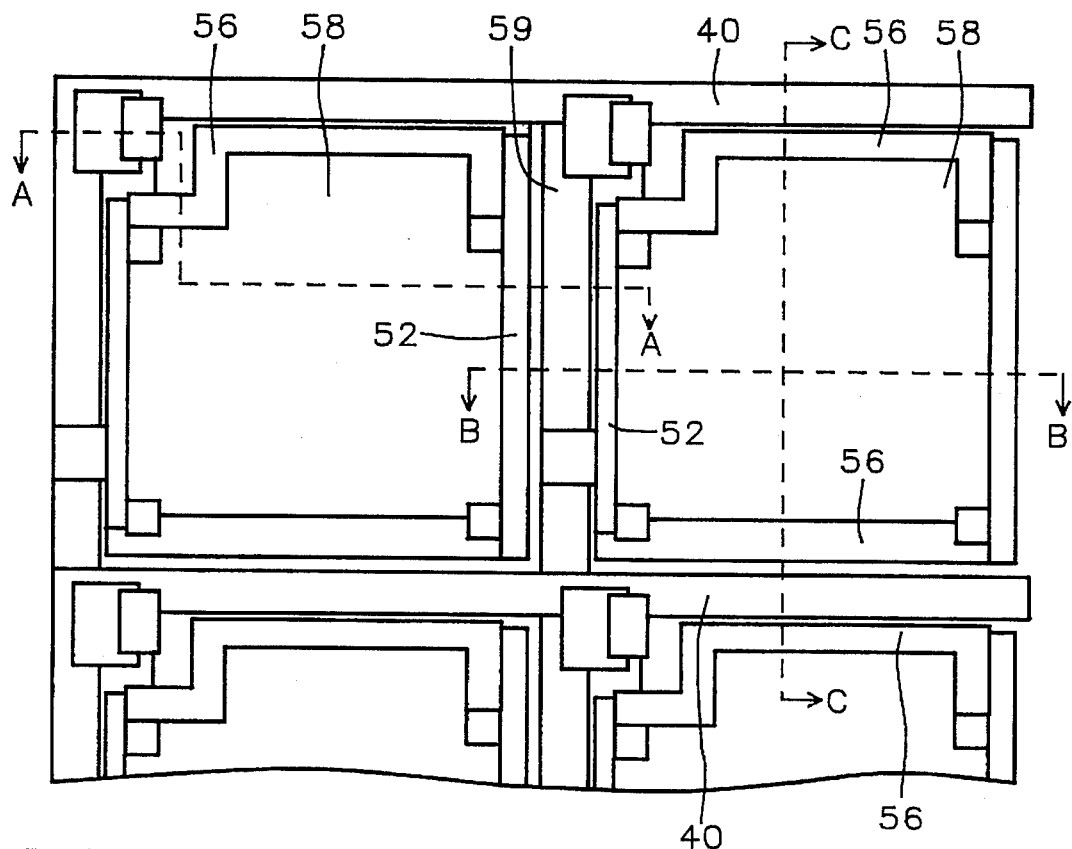
Figure 5C:
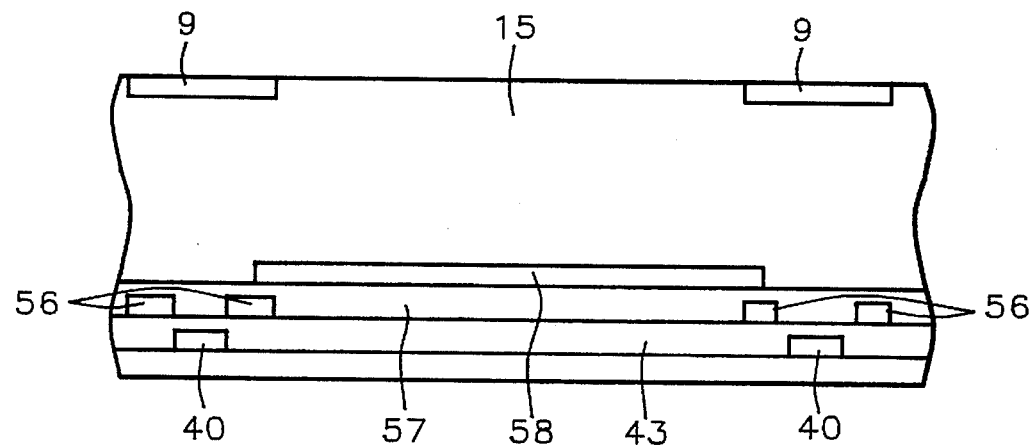
Figure 5D:
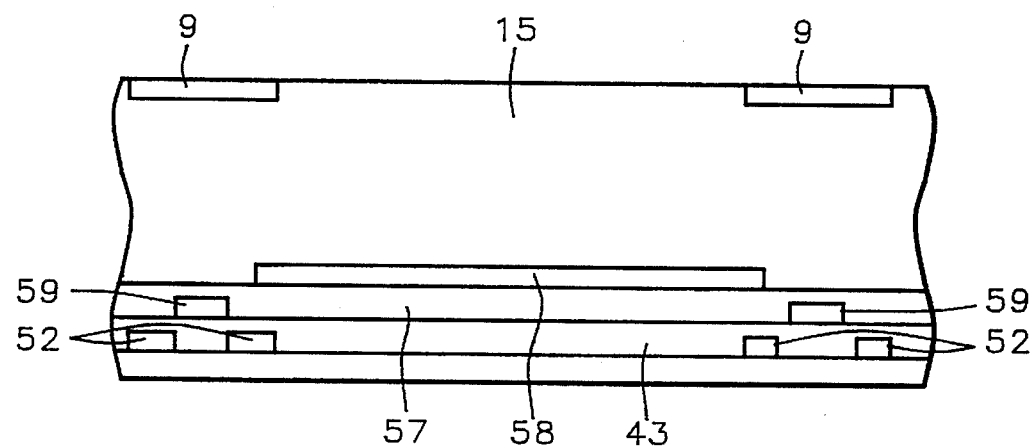

FIGS. 5(a)–5(d) show another embodiment of the present invention. FIG. 5(a) is a cross-section taken through AA in plan view FIG. 5(b). FIG. 5(c) is a cross-section of FIG. 5(b) taken along vertical line CC. FIG. 5(d) is a cross-section of FIG. 5(b) taken along horizontal line BB. The process for forming this embodiment is the same as that previously described in reference to FIG. 4, the difference being that the storage electrode 52 has been slightly separated from data line 59 and storage electrode 56 slightly separated from scan lines 40, so a black matrix 9 has been added to the upper glass to block light passing through the resulting gaps between storage electrode, data line and scan line. Compared with the conventional process, they have the same number of process steps, but the gap spacing in the present invention between storage electrode and scan line can be efficiently reduced since staggering different conducting layers onto different levels avoids co-planar shorts. This makes possible the achievement of a higher aperture ratio.

To support our claim of greater efficiency for the structure of the present invention we note the following:

For the same pixel size, the aperture ratio associated with the embodiment of FIG. 4 is about 61% while that associated with the embodiment of FIG. 5 is about 53%. When using conventional structures of the prior art, such as that shown in FIG. 2, the aperture ratio is only about 43%.

Figure 6:
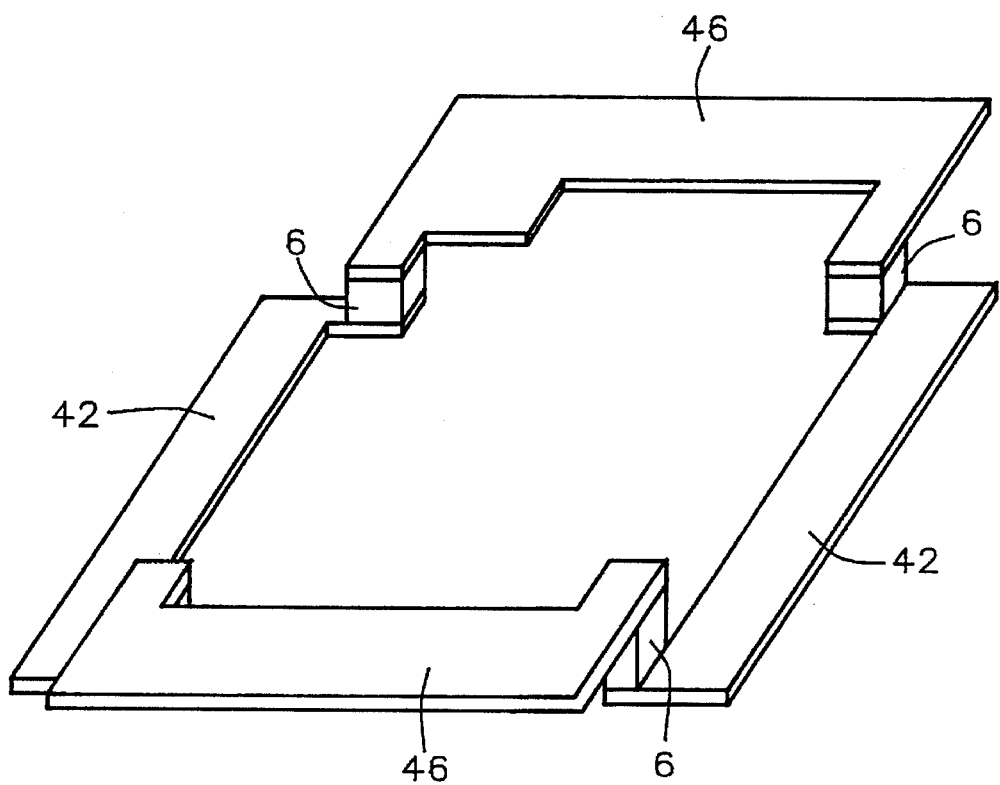
FIG. 6 is an isometric view of the lower (hollow square) capacitor electrode.

In order to help visualize the three dimensional appearance of the capacitor, we show, in FIG. 6, an isometric projection of the lower (hollow square) electrode. The capacitor dielectric and the upper electrode are both common to all capacitors of the display so are now shown here.

While the invention has been particularly shown and described with reference to the preferred embodiments thereof, it will be understood by those skilled in the art that various changes in form and details may be made without departing from the spirit and scope of the invention.

What is claimed is:

1. A thin film liquid crystal display comprising:
   a first transparent insulating substrate upon whose surface are conductive scan and data lines, said scan and data lines being orthogonally disposed relative to each other and electrically insulated from each other;

a thin film field effect transistor whose drain is connected to a data line and whose gate is connected to the adjacent scan line;

a thin film capacitor having a lower electrode in the shape of a hollow square, two non-adjacent sides of said hollow square being at the level of said gate electrode, the other two sides of the hollow square being at the level of said data line;

means for providing electrical contact between all four sides of said lower capacitor electrode;

a transparent conductive layer that serves both as a pixel electrode and as an upper electrode for said thin film capacitor;

electrical connection between said pixel electrode and a source region of said thin film field effect transistor;

electrical connection between said lower capacitor electrode and a scan line once removed from the scan line to which said gate is connected; and a layer of liquid crystal in contact with said pixel electrode and kept in place by a second transparent insulating substrate.

2. The structure of claim 1 wherein the means for providing electrical contact between all four sides of said lower capacitor electrode comprises four via holes, located at the four corners of the hollow square, through which material from the two layers that are at different levels make electrical contact.

3. The structure of claim 1 wherein the means for providing electrical contact between all four sides of said lower capacitor electrode comprises two via holes, located at two adjacent corners of the hollow square, and an overlap of said pixel electrode and the scan line, through which material from the two layers that are at different levels make electrical contact.

4. The structure of claim 1 wherein said lower capacitor electrode and said scan lines do not overlap.

5. The structure of claim 4 further comprising a black matrix electrode located on the surface of said second transparent insulating substrate.

6. A process for manufacturing a thin film liquid crystal display cell, comprising:

(a) providing an insulating transparent substrate;

(b) depositing a first conductive layer onto a surface of said substrate;

(c) patterning and then etching said first conductive layer so as to form a gate electrode, a scan line, and a first lower capacitor electrode;

(d) depositing a first insulating layer over said patterned first conductive layer;

(e) depositing a high resistivity layer of N type amorphous silicon over said first insulating layer;

(f) depositing a low resistivity layer of N+ type amorphous silicon over said high resistivity layer;

(g) patterning and then etching said layers of amorphous silicon so as to form a high resistance channel having a low resistance source contact at one end and a low resistance drain contact at the other end;

(h) etching contact holes through said first insulating layer down to the level of said first conductive layer;

(i) depositing a second conductive layer over said first insulating layer;

(j) patterning and then etching said second conductive layer so as to form source and drain connectors, a data line, and a second lower capacitor electrode;

(k) depositing a second insulating layer over said patterned second conductive layer;

(l) etching contact holes through said second insulating layer down to the level of said second conductive layer;

(m) depositing a layer of transparent conductive material over said second insulating layer;

(n) patterning and then etching said transparent conductive layer so as to form a pixel electrode and serving as upper capacitor electrode; and (o) placing a layer of liquid crystal in contact with said pixel electrode and providing a second transparent insulating substrate for the purpose of keeping said layer of liquid crystal in place.

7. The process of claim 6 wherein said first conductive layer comprises a metal taken from the group consisting of chromium, tantalum, aluminum, and tungsten.

8. The process of claim 6 wherein the method used for depositing said first conductive layer is sputtering.

9. The process of claim 6 wherein said first insulating layer comprises material taken from the group consisting of silicon nitride, silicon oxide, and aluminum oxide.

10. The process of claim 6 wherein said second conductive layer comprises a metal taken from the group consisting of chromium, tantalum, aluminum, and tungsten.

11. The process of claim 6 wherein said second insulating layer comprises material taken from the group consisting of silicon nitride, silicon oxide, aluminum oxide and polyimide.

12. The process of claim 6 wherein said transparent conducting layer comprises indium tin oxide.

* * * * *